United States Patent [19]

Smith et al.

[11] 4,310,406
[45] Jan. 12, 1982

[54] APPARATUS FOR REMOVING METAL IONS AND OTHER POLLUTANTS FROM AQUEOUS SOLUTIONS AND MOIST GASEOUS STREAMS

[75] Inventors: Avery B. Smith, Wallingford; Mark J. Hayes, Sandy Hook, both of Conn.

[73] Assignee: Resource Control, Incorporated, West Haven, Conn.

[21] Appl. No.: 764,255

[22] Filed: Oct. 1, 1968

[51] Int. Cl.³ .......................... C25B 9/00; C25C 7/00; C02F 1/46
[52] U.S. Cl. ...................................... 204/275; 204/149
[58] Field of Search ......................... 204/149, 152, 275

[56] References Cited

U.S. PATENT DOCUMENTS 3,616,356 10/1971 Roy ..................................... 204/152

*Primary Examiner*—Howard S. Williams
*Attorney, Agent, or Firm*—Curtis, Morris & Safford

[57] ABSTRACT

This invention concerns the electrochemical removal of metal ions and certain other contaminating ions from aqueous solutions and moist gas streams. Direct current from an external source is caused to flow through electrically conductive particulate elements or packing forming a bed of low electrical conductivity from two or more oppositely charged spaced electrodes maintained in direct physical contact with conductive particulate elements or packing. The aqueous solution or moist gaseous stream to be treated is brought into contact with the conductive bed while current is supplied to the electrodes and flows through the bed. The characteristics of the system are such that each bed element exhibits bipolar properties causing a multiplicity of electrically positive and negative sites to exist within the bed at which electron transfer with the pollutant ions occurs, changing their state and effectively removing them from the fluid.

9 Claims, 8 Drawing Figures

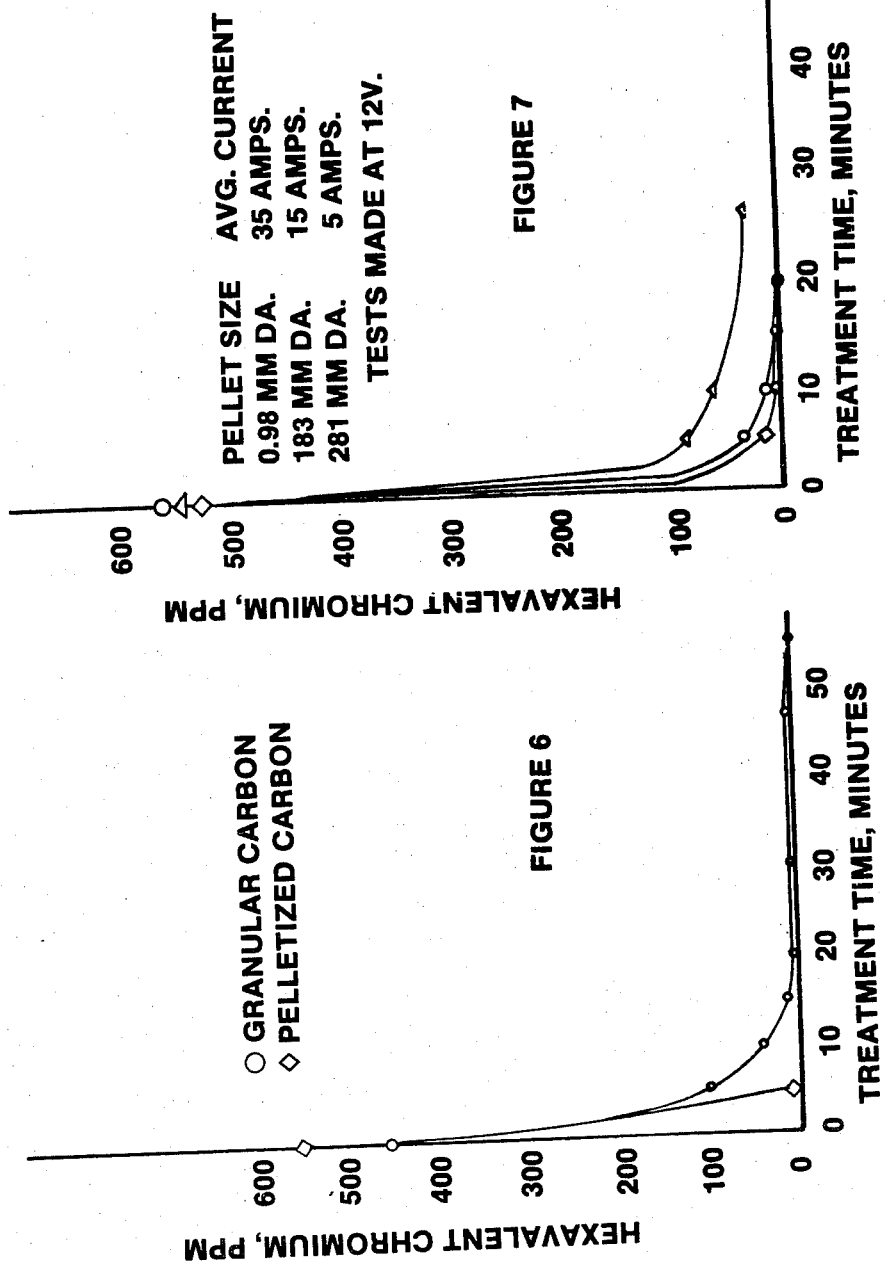

APPARATUS FOR REMOVING METAL IONS AND OTHER POLLUTANTS FROM AQUEOUS SOLUTIONS AND MOIST GASEOUS STREAMS

This invention relates to apparatus for and a method of treating aqueous fluids to remove metal ions and certain other pollutants therefrom, and more particularly is directed to the treatment of spent process solutions, waste streams, brines, brackish waters and sea water, and the wet scrubbing of contaminated gaseous streams.

With increasing demand being made upon existing water supplies, conservation of these supplies becomes ever more important. Not only is it important to effect greater economy in the use of existing water supplies, but it is also more and more necessary, as health, conservation and governmental restrictions become more stringent, to process spent or waste liquids prior to dumping them as effluents in sewers, rivers, lakes or other available disposal outlets.

The current methods for the treatment of effluents containing toxic or otherwise harmful constituents include chemical oxidization or reduction, chemical or mechanical precipitation and sedimentation, ion exchange, chemical neutralization, electrodialysis, electrolysis, and evaporation, to name some of the more important ones. The various chemical treatments are generally subject to disadvantages in high cost of treatment equipment and materials, storage and treatment equipment capacity and maintenance, and in the preparation and control of injection or other introduction of the treatment chemicals to the fluid to be treated. Mechanical processes are likewise subject to treatment equipment capacity, high initial cost, maintenance, and proper operating control. Among electrical treatments proposed, electrolysis seems to present the best prospects for handling the large volumes of solutions generally encountered, but studies of the electrolysis systems employed heretofore have shown that these are efficient in practical commercial use only for highly concentrated solutions and that they are not satisfactory in reducing pollutant ion concentrations down to the very low order or level required for most purposes.

In a conventional electrolytic cell, direct current is applied to spaced electrodes immersed in the solution undergoing treatment, and the electrical circuit of the system is completed solely through ionization of the solution and migration of the ions to the surfaces of the electrodes. Thus all of the current in a conventional electrolytic cell is carried through the solution by ion migration. At the surface of the electrode, an electrical charge is transferred between the ions in solution and conductive electrode. At the anode, electrons are lost to the electrode, or oxidation occurs; at the cathode, electrons are gained from the electrode, or reduction occurs. The electrodes thus act as the catalytic surfaces on which the electrochemical reaction takes place, and the reaction is localized, i.e. takes place only at the electrode surfaces. Since the current or flow of electrons within the electrolyte is carried only by the ions, for any given fixed applied potential at the electrodes, the amount of current passing through the system is, in general, proportional to the concentration of the ions present in solution. Hence, as the ion content decreases, the current in the system also decreases, and since the reactions which occur at the electrode are dependent on the flow of electrons, it can be seen that the rate of the reactions decreases with decreasing concentrations. It is also obvious from the above that the resistance or resistivity of the electrolyte itself increases with decreasing concentration of ions present. Thus, for a fixed applied potential, in order to maintain a substantially constant rate of electron flow it would be necessary to decrease the distance between the electrodes as ion concentration decreases. This is generally impractical.

In a previously published report on the electrolytic oxidation of cyanide ("Electrolytic Decomposition of Concentrated Cyanide Plating Wastes" J. K. Easton, PLATING, page 1340, Nov. 1966, Amer. Electroplating Soc.), it has been shown that as the concentration of cyanide ion decreases, progressively longer times are required to achieve further reduction in cyanide ion concentration under fixed electrolytic conditions using a conventional electrolytic cell. According to the reported results, it requires 12 days of electrolysis using the conventional cell to reduce cyanide concentration from approximately 6000 ppm. to 0.2 ppm., and this is at elevated electrolyte temperature. Others who have studied electrolytic decomposition of cyanide effluents from metal finishing processes using conventional cells have also found that the process is efficient only at high ion concentrations, and that at cyanide concentrations below 500 ppm., the efficiency of the system drops to a value so low as to make its use prohibitive commercially.

The present invention involves a modification of the usual electrolysis procedure and by reason of such modification, affords substantial improvement over and economies in respect to prior effluent treatment systems, including not only electrolysis but chemical and mechanical processing as well. Metallic and certain other ionic contaminants such as cyanide mentioned above, as well as organic contaminants in some instances, can be removed utilizing the teaching of the present invention. In comparison with prior methods of treatment of spent processing solutions and the like, the method and apparatus of the present invention are more compact, simple and efficient, and consequently less costly. The system is applicable to solutions arising from operations in metal finishing industries, also to paper mill effluents, brackish waters, sanitary and municipal sewage and the like, providing a practical system for the recovery and reuse of the water in such solutions, as well as for recovery of valuable metal contents in such solutions and safe disposal of the effluent.

The characterizing feature of the invention is the provision of a bed formed of solid particulate electrically conductive packing elements, and disposed in this bed there are at least two spaced electrodes making electrical contact with the packing elements. The composite bed and electrodes are supported in some suitably insulated treatment vessel to which the metal-containing solutions or other impure aqueous fluids to be treated are introduced while direct current of appropriate potential is applied to the electrodes from a suitable power source. Due to contact resistance of the packing elements and at the electrode surfaces, an electrical path of relatively low conductivity is established through the bed and it is postulated that at least in part because of this there is produced in this system a phenomenon known as bipolarity in the individual particulate packing elements, thus causing a multiplicity of positive and negative sites to exist within the bed. When a solution or moist gaseous stream containing metal ions is introduced into or passed through the electrically charged bed of the system, an electrochemical reaction occurs at each of such sites whereby positively charged ions are reduced and deposited on or at the negatively charged portion of the bed elements. Additionally, where metal ions are present, precipitation of such ions can and does occur within the vessel due to reaction with other ions whose concentration is influenced by the electrochemical action. Thus, the metal ion concentration of the solution or gaseous stream is reduced to a very low level. Where, as is often the case, the solution contains other types of contaminant ions such as cyanide or similarly oxidizable ions such as the halogens, the oxidizing characteristics of the positively charged portions of the bed particles are simultaneously utilized for the oxidation, decomposition and/or removal of such ions, thus reducing their concentrations to very low levels also. Proper selection of the particulate bed material to provide adsorbent properties will also afford a means of reducing some organic contaminants in the solution being treated as well.

By properly regulating the electric potential applied across the fixed bed, the quality of the discharge stream can be closely controlled and specific or selective action, in which certain contaminants are removed while others are not, can be accomplished.

The fixed bed type of operation which is utilized in the process of the present invention provides a compact method of unusually high capacity for removing metal and other contaminant ions from solution. Employment of the solid particulate packing elements permits regeneration of the bed and recovery of the metals removed from solution, both in the same operational step.

When used for treating industrial wastes, the process of the invention readily produces an effluent stream of a suitable quality for reuse in cooling and rinsing operations, or simply one that is adequately purified to permit dumping it, as a minimum level of improvement in reducing contaminant content. Under suitable operating conditions, the system may be utilized to produce an effluent which is suitable with or without further simple purification steps for domestic use.

The present invention overcomes the inherent difficulties encountered with conventional electrolytic cells in the treatment of dilute or low ion concentration solutions as commonly encountered in both water and air pollution control applications. This results from two primary factors. First, the flow of electrons or the work-producing force is controlled mainly by the total resistivity or conductivity of the particulate bed employed, and is only slightly dependent on the concentration or resistance of the electrolyte solution itself. Secondly, the problem of migration of ions to electron-giving and accepting sites is overcome by the presence of a multiplicity of oppositely charged sites distributed throughout the bed of particulate media owing to the bipolar phenomenon, i.e., oppositely charged particulate portions, produced in respect to each particle or element of the bed. The number of catalytic sites at which electron transfer can take place with the ions in solution is thus multiplied many times in comparison to the situation prevailing in the conventional electrolytic cell.

Further description and illustration of the invention is presented herewith with reference to the accompanying drawings, in which FIG. 1 is a schematic representation of a conventional electrolytic cell and the type of ion migration that occurs in such cell;

FIG. 6 is a graphical representation of hexavalent chromium ion content vs. treatment time for identical solutions using two different shapes or geometric forms of packing elements in the bed;

Figure 8:
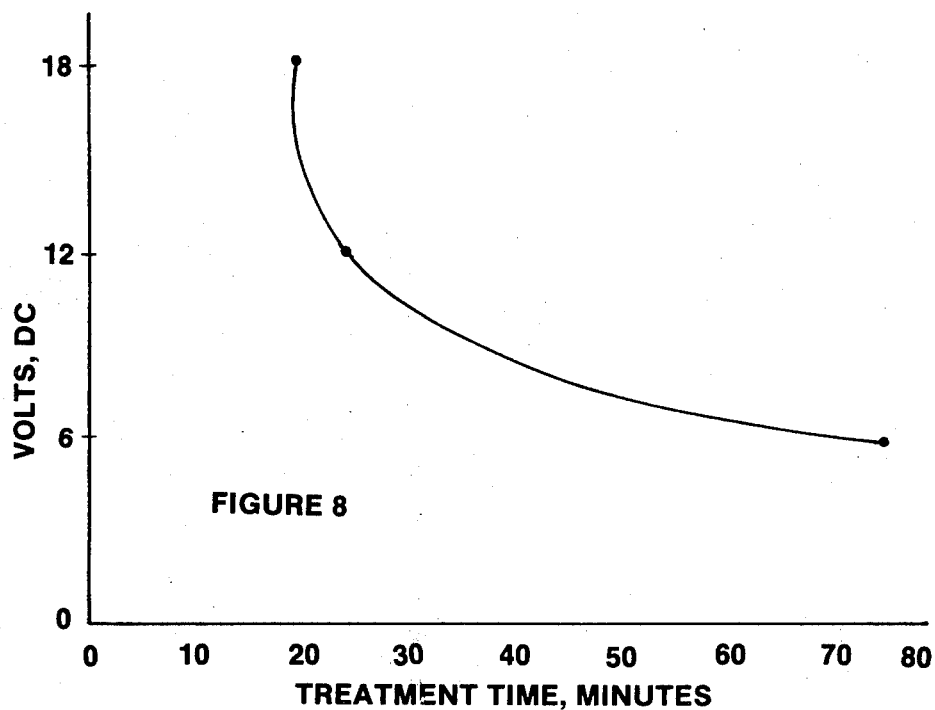

FIG. 7 is also a graphical representation of hexavalent chromium ion concentration against treatment time showing the effect of bed particle size on ion removal rate where the geometric form or shape of particle is uniform; and FIG. 8 is a graphical plot of applied electrode voltage vs. treatment time required to remove hexavalent chromium ion from an initial concentration of 175 ppm. to non-detectable level.

Figure 1:
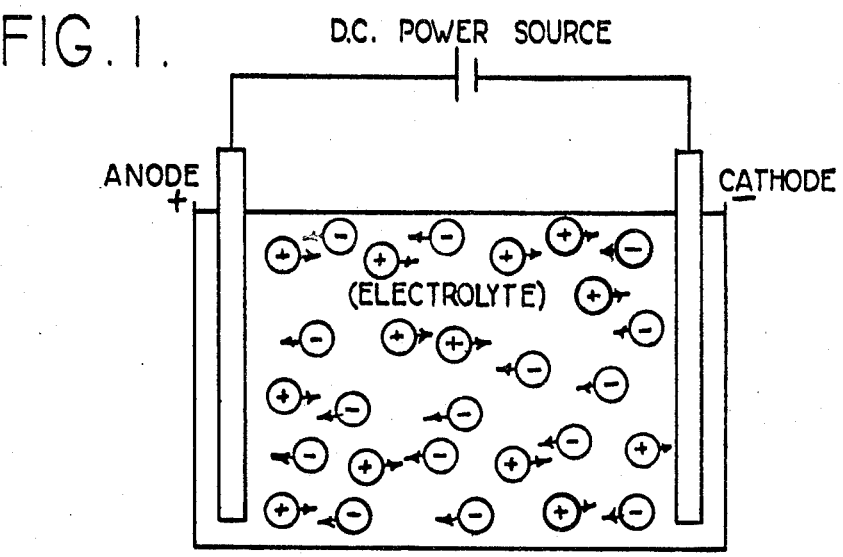
Figure 2:
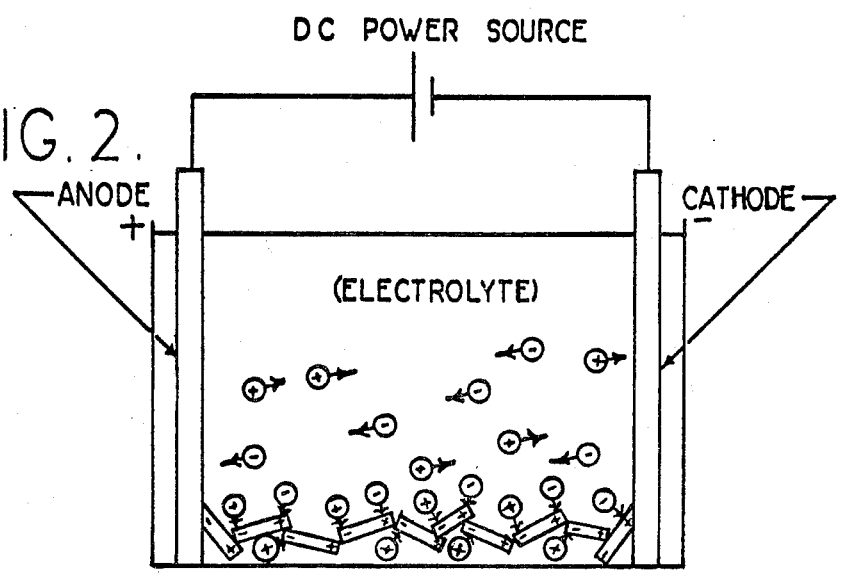
FIG. 2 is a similar schematic of a cell in accordance with the present invention and illustrating the bipolar effect produced in the elements of a single layer bed upon application of voltage to opposed electrodes in contact with the bed.

With reference to FIGS. 1 and 2, it will be apparent that the distances which the various ions in solution must travel to reach a catalytic site where electron exchange can occur is much greater in the case of the conventional electrolytic cell shown in FIG. 1 than in the cell of the present invention illustrated in FIG. 2. In FIG. 2, a bed having only a single layer of packing elements is shown for simplicity of illustration; in practical operation the fixed bed will consist of a large number of such layers produced by the random packing of the media about the electrodes. The phenomenon known as bipolarity produced in the individual particles, whereby oppositely disposed portions of the bed particles assume opposite electrical charges, is illustrated here by plus and minus sign designations on the individual particles in the drawing.

Figure 3:
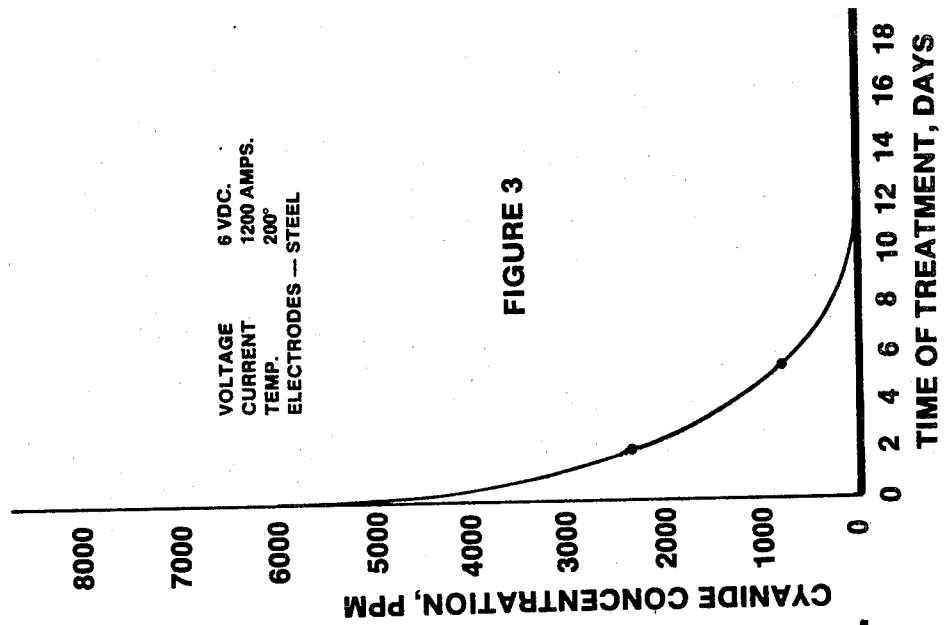
FIG. 3 is a graphical representation of cyanide ion concentration vs. treatment time resulting from conventional electrolysis of a sodium cyanide solution.
Figure 4:
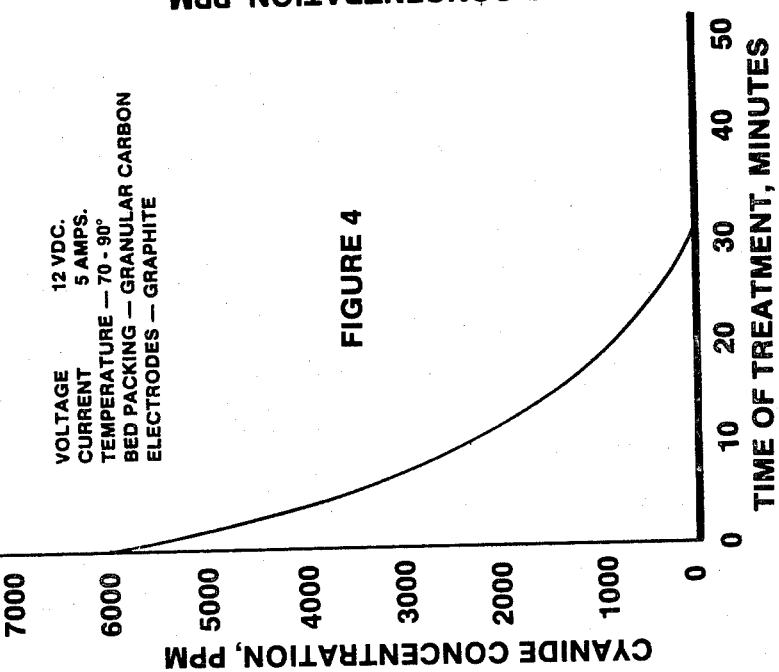
FIG. 4 is a graphical representation, similar to that of FIG. 3, showing the results of electrochemical treatment of a cyanide-containing solution using the system of the present invention.

The very different result obtained in treating a typical dilute sodium cyanide solution, similar to waste effluent solutions commonly encountered in metal processing industry, by the conventional and the invention procedures is readily apparent from comparison of FIGS. 3 and 4, respectively, of the drawings. FIG. 3 is taken from the published results of the "Plating" article referred to above in which a conventional electrolytic cell was used. Low carbon steel electrodes were used and afforded an advantage to the system in that anode reaction with the cyanide in solution to produce ferricyanide compounds which helped to reduce free cyanide. Severe anode corrosion was reported which confirms this. Still it will be noted that it required about 12 days of processing time to reduce the initial cyanide concentration from 6000 ppm. to a non-detectable level and that, while there was an initial rapid decrease in cyanide ion content, the curve is asymptotic so that progressively longer periods of time are required to reduce cyanide ion concentrations as these approach the zero level.

For comparison, treatment of a waste cyanide solution containing the same initial cyanide concentration (6000 ppm.) as before but employing the invention process is plotted in FIG. 4. A total of only about 30 minutes is required to reduce the cyanide concentration to a non-detectable level in this case. Graphite electrodes were used here, in contrast to the steel ones in the previously reported test, and being insoluble they could not assist the cyanide removal by chemical reaction. In the invention procedure, the solid particulate bed was composed of granular carbon of highly irregular, random shape having a mesh size of approximately 2×4.

It will be noted that whereas the rate of decrease in ion concentration in the solution begins to become asymtotic at a level of 500-1000 ppm. in the case of the conventional cell as seen in FIG. 3 and that the ion removal proceeds very slowly thereafter, it requires a total of only about 8 minutes to reduce the ion concentration from 500 ppm to zero utilizing the invention. It is in this low concentration range that the present invention is most significant since this is commonly the level of metal ion contaminant present in waste solutions to be treated. And it can be seen from this why it has been generally reported heretofore to be commercially prohibitive to employ electrolysis of dilute cyanide solutions using conventional electrolytic cells in order to reduce ion concentration to a suitably low level.

In a typical case utilizing the present invention, a 120 gal. treatment tank was employed containing about 350 pounds of pelletized carbon 1.98 mm. in diameter as the bed media. A solution of sodium cyanide having a cyanide concentration of 100 ppm. was run through the treatment tank at a rate of 6 gallons per minute which was equivalent to about 3 gallons per minute per square foot of unit area. Graphite electrodes were used, spaced about two feet apart, providing a total electrode area of approximately 30 square feet. The applied electromotive force was 9 volts D.C. at 400 amperes. Under these conditions that initial cyanide content was reduced in the effluent to less that 0.1 ppm. From an economic standpoint, this represents a processing cost of 8 to 12 cents per pound of cyanide (4 to 5 cents per pound of sodium cyanide). Comparable cost for conventional alkaline chlorination of cyanide, which is representative of the best previously available results, is generally on the order of at least fifteen to twenty times as much.

Figure 5:
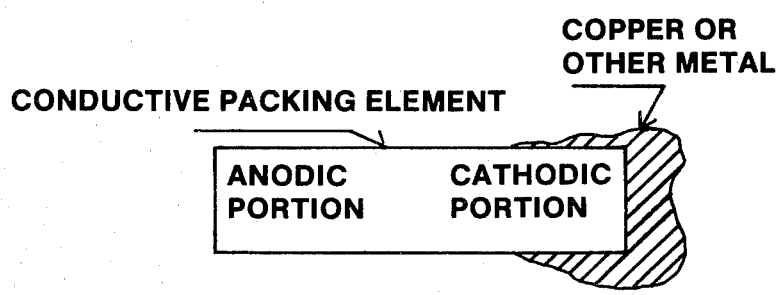
FIG. 5 is a schematic illustration of a typical particle or packing element after use in treating a metal containing solution in accordance with the present invention, showing the build-up of a metal at the cathodic portion of the element.

In the case of solutions containing only cyanide, such as sodium cyanide as the principal contaminant the cyanide ion is converted to carbon dioxide and nitrogen both of which evolve as gases. Simultaneously the sodium ions in solution are reduced transitorily to metallic state but probably react immediately with water and carbon dioxide to produce sodium carbonate and possibly some hydrogen. The resulting cyanide-free solution in any event has a pH of from 6 to 10 which is well within the usual limits permissible for dumping.

Where there are heavy metal ions in solution also, such as a solution containing zinc cyanide in combination with sodium cyanide and sodium hydroxide as commonly found in effluents from electroplating of zinc, zinc is removed from the solution as a zinc metal deposit on the cathode electrode and on the cathodic portion of the conductive media particles, as illustrated in FIG. 5 of the drawings. In addition, zinc is precipitated as zinc hydroxide by reaction in solution. And again there is the anodic oxidation of the cyanide, resulting in a solution free of both zinc and cyanide contaminants.

Similar removal of other metal ions, including silver, iron, brass, copper, nickel, cadmium, chromium and magnesium is obtained if these are present in the original solution. Such metals again deposit out on the cathodic portions of the packing elements and on the cathode electrode.

The type of material used as the bed media has substantial effect upon the operation of the system of the invention. As previously described, the function of the bed is to carry current between the electrodes in such manner as to create a multiplicity of oppositely charged sites throughout the bed. In general, the packing elements should be chemically inert or insoluble in the solutions being processed so as to avoid contamination of the solution with dissolved media. Also, the contact resistance of the elements in the composite bed must be high enough to prevent direct short circuiting the electrodes when the current is supplied to them. However the resistance should not be so high as to require excessively high voltage to produce the required current flow and individual element bipolar effect mentioned above. Several types of material lend themselves to use as bed media, including cermet and powdered metal compacts, for example. The most practical and least expensive materials presently known however are carbonaceous, including carbon itself, charcoal, graphite and pelleted forms of such carbonaceous materials.

Both the size and shape of the media particles affect the system operation. This is shown, for example, by comparison of tests on waste plating solutions containing hexavalent chromium, using granular carbon with a mesh size of approximately 2×4 having a highly irregular shape, and a second type of media comprising pulverized and then pelletized carbon extruded into generally cylindrical elements or units of essentially uniform shape and size. A comparison of the two forms of media under identical test conditions is shown graphically in FIG. 6, from which it is quite apparent that the uniform pelletized carbon particles are far more efficient in the removal of the contaminating ions. Starting with a solution containing as a contaminant hexavalent chromium ions at a concentration of 600 ppm., it takes about an hour to reduce the detectable chrome content to zero utilizing heterogeneous granular carbon particles. On the other hand, utilizing the uniform pelletized cylindrical carbon as the elements of the bed media, it requires only about 6 minutes. This difference in time can probably be attributed to the more pronounced bipolar effect of the bed media where uniform columnar particles or packing elements are used, and greater number of reaction sites provided by such packing elements than in the case of the random shape elements.

The effect of size of packing element on operation of the system is apparent from comparison of results for three different sizes of activated carbon pellets in extruded columnar form plotted in FIG. 7. Again using a standard solution containing hexavalent chromium as the pollutant ion, tests run with packing beds composed of pellets having diameters of 0.98 mm., 1.88 mm., and 2.81 mm., all with a length-to-diameter ratio of approximately 3:1, indicated that the pellets of intermediate size, i.e. 1.88 mm. diameter, produce optimum results. The explanation for this is believed to lie partially in the fact that the smallest size of pellet results in a bed which is relatively dense or compact, giving a very low total contact resistance between the electrodes. Because of this, current flow is quite high, resulting in the development of considerable heating of the solution due to the high wattage consumption. It would also seem logical to conclude that the tight packing or low contact resistance in this case actually reduces the number of bipolar occurrences in the bed.

Conversely, the largest size pellet produces a bed which gives a relatively high total contact resistance between the electrodes, reducing the flow of current through the bed. For the same volume of fixed bed, the larger pellets will of course present fewer possibilities for bipolar sites.

In addition to the ready availability and low cost of carbonaceous materials as bed media, such materials have the advantage of virtually complete inertness to the reactions taking place in solution. An additional advantage is gained through the use of activated carbon type material which, because of its high adsorbency for organic materials, can also act as a mechanical filter or adsorbent should such organic contaminants be present in the solution.

The use of insoluble or inert packing elements such as the carbonaceous pellets mentioned affords the possibility for reclaimation or reuse not only of the bed media itself but of the metal caused to deposit out on the media. For example, when the system is used to treat rinse water resulting from copper plating operations, the extracted metal builds on the cathodic portions of the packing elements as mentioned above and when the build-up of the metal reaches a level where it begins to adversely affect the overall resistance of the bed, the bed can be removed from the tank or other processing vessel, placed in a suitable container and used anodically on the copper plating bath. The copper will thus be redissolved into the plating bath and reused for plating purposes.

Reduced metal may also be dissolved from the packing media through treatment with a suitable oxidizing agent, such as a strong acid, and collected in concentrated form for further processing or reuse. Such recovery can be carried out within the original treatment vessel itself, or in auxiliary equipment if the media is removed from the treatment vessel.

Selection of the type of material for use as the electrodes is not critical and, as in the case of the packing media, it will normally be advantageous to use insoluble electrode materials to prevent re-contamination of the process solution. Graphite electrodes perform successfully and are inexpensive and readily available. Electrodes must be shaped and positioned so that the packing media lies in the path of the normal current flow between the electrodes but both parallel flat electrodes and concentric circular electrodes have been used successfully. Spacing of the electrodes in the bed must be adjusted to maintain the previously mentioned bipolar effect in the media particles at the selected operating voltage. Actual determination of the optimum spacing will normally require some experimentation but visual check of this can be obtained by observing the degree or completeness of coverage by reduced metal on the cathodic portions of the media particles.

Variation in the potential applied to the electrodes has a direct effect upon the operation of the invention system. The direct current potential applied across the electrodes must be high enough to produce the aforesaid bipolar effect and to provide an adequate flow of electrons to accomplish the desired electron transfer reactions. The major criterion of course is that of producing the maximum bipolar effect throughout the packing media and from what has been described above, this will depend on a number of factors including particle size of the packing elements, distance between the electrodes, number of electrodes and the voltage applied thereto. Considerable variation, therefore, is possible in these parameters. As a general rule, conditions of packing size and resistivity which result in a current flow of from about 1 to 100 amperes per cubic foot of bed at applied voltages of from 6 to 18 volts d.c. at the electrodes, with current densities at the electrodes of up to 200 amperes per square foot of electrode surface, represent a preferred range of operation of the system. However the bipolar effect appears to be achievable at applied voltages substantially above the range indicated. This will depend on the nature of the solution being treated and initial contaminant content, as well as flow rates, adjustment in electrode size and spacing, packing size and bed resistivity. Furthermore it is not necessary that both electrodes be of the same size and operate at the same cathode current density. For example, one electrode or set of electrodes may have a surface area larger than the other.

Some idea of the effect of change is applied potential at the electrodes is illustrated graphically in FIG. 8 of the drawings which is a plot of applied voltage against time required to completely remove 175 ppm. of hexavalent chromium ion from solution. The test in this instance employed random size granular carbon of about 2×4 mesh as the packing media rather than uniform carbon pellets, but the comparison is valid for the latter type of bed media as well. At low voltage, time for complete removal becomes excessive, whereas above the 12 volt level only a small decrease in time is obtained which usually does not justify the increased power costs of operating at such conditions. Optimum performance here occurs at an applied potential of 8 to 10 volts D.C.

Other variables in the system include the concentration of the contaminant ion or ions in solution. So far as the invention system is concerned, however, there appears to be no theoretical upper limit in concentrations that can be treated, provided adequate contact time is allowed for completion of the reaction. In general, the rate of contaminant ion removal increases with concentration, all other factors being constant.

Agitation or circulation of the solution undergoing treatment within the vessel is beneficial but not essential. In a continuous flow process, where the contaminated solution enters at one point in the treatment vessel and passes continuously over the packing and between spaced electrodes to a point of discharge, agitation will be effected by such flow. In this regard, however, flow velocity should be low enough so as not to disturb the packing arrangement of the bed. If the bed is disrupted, rearrangement of the elements occurs and portions of the elements that previously were cathodic may then become anodic, leading to the dissolution of previously deposited metal and the recontamination of the solution. In batch treatment, agitation may be provided by recirculation of the solution in the fixed bed by a pump, but here again agitation should not be so vigorous as to lead to mechanical rearrangement of the packing elements of the bed.

So far as now appears there is little or no variation in operating result occasioned by change in the pressure under which the process is carried out. However, some increase in solution temperature has been noted to be beneficial although the system operates satisfactorily at temperatures ranging anywhere from 40° F. to boiling.

Successful removal of silver, brass, iron, copper, nickel, zinc, cadium, chromium and magnesium cations has been achieved. As mentioned before, it is possible to get selective removal of some of these metals in preference to others where they are present in admixture by varying the potential applied to the electrodes and the rate of current flow through the bed. Thus, successive treatment beds or bed regions and cooperating sets of electrodes in said beds or regions may be arranged in cascade fashion to effect selective ion removal at different locations along the flow path of the fluid undergoing treatment. As already mentioned anions such as cyanide and the halogen ions are also removed by the method disclosed.

What is claimed is:

1. Apparatus for the removal of contaminants from aqueous fluids electrochemically, which comprises:
    a treatment vessel for containing the fluid to be treated;
    a bed in said vessel, said bed including solid particulate packing elements forming a media of low electrical conductivity;
    at least two electrodes including a cathode and an anode in relation to said bed so as to be in direct contact with elements thereof and in spaced relation to each other in said vessel; and
    means for connecting a source of direct electrical current to said electrodes to induce a potential difference between said electrodes across said bed and through said elements.

2. Apparatus as defined in claim 1, which further includes means for continuously introducing at one point in said vessel the fluid to be treated, and other means for removing the treated fluid at a different point in the vessel.

3. Apparatus as defined in claim 1, wherein said bed media is composed of carbonaceous particulate packing elements.

4. Apparatus as defined in claim 3, wherein the elements are of random coarse granular form.

5. Apparatus as defined in claim 3, wherein the elements are of generally uniform, elongated, cylindrical form.

6. Apparatus as defined in claim 5 wherein the diameter of said elements is approximately at least 1 mm.

7. Apparatus as defined in claim 5, wherein said elements have a length to diameter ratio of at least about 3:1.

8. Apparatus for removal of contaminants such as metal ions and other pollutants from aqueous fluids electrochemically which comprises:
    a treatment vessel for containing the fluid to be treated;
    a bed contained in said vessel, said bed including solid, particulate, electrically conducting packing elements forming a media of low electrical conductivity;
    said elements having a width of about at least 1 mm;
    at least two electrodes including a cathode and an anode in relation to said bed so as to be in direct contact with elements thereof and in spaced relation to each other in said vessel; and
    means for connecting a source of direct electrical current to said electrodes to induce a potential difference between said electrodes and across said bed and through said elements, said elements providing contact resistance sufficiently high to prevent short circuiting the electrodes when current is applied thereto.

9. Apparatus as defined in claim 8 wherein the elements provide a multiplicity of oppositely charged sites through the bed and between the electrodes.

* * * * *